Dec. 16, 1924.  
E. C. ZIMMERMAN ET AL  
1,519,602  
EXTENSOMETER  
Filed Jan. 21, 1922
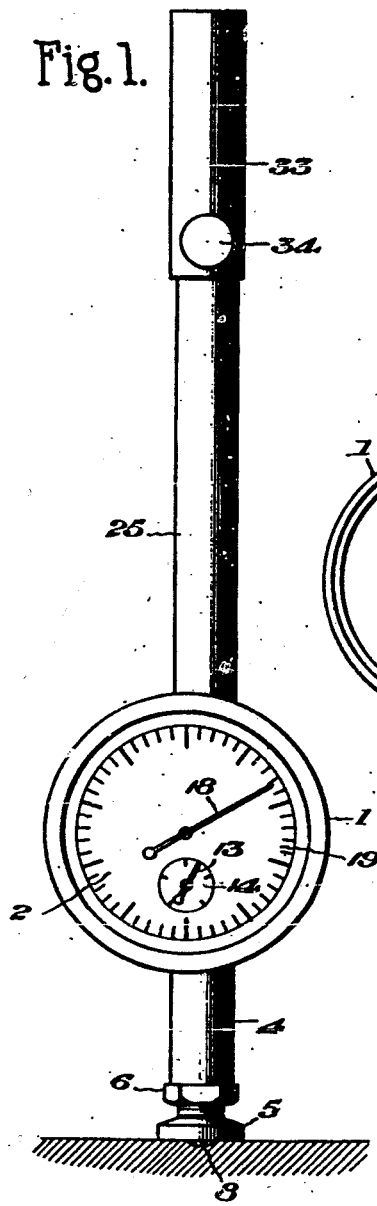
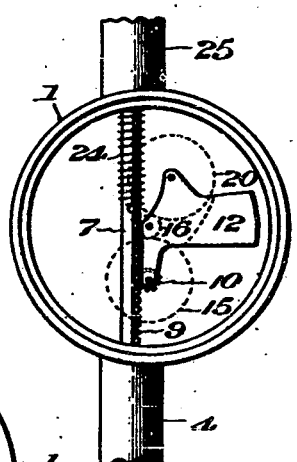
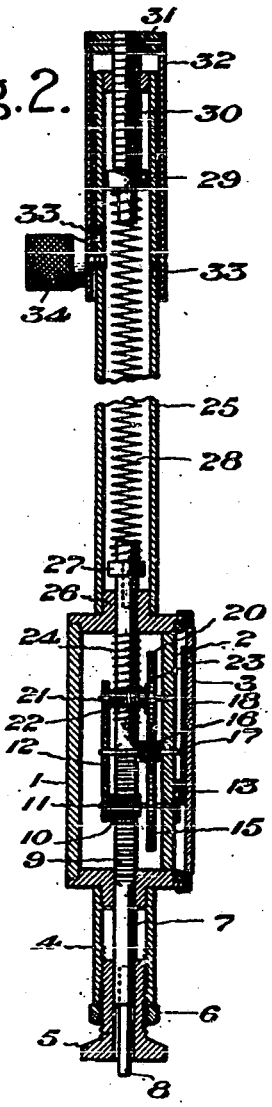
INVENTOR.  
*Erle C. Zimmerman*  
BY *Ira Williams*  
ATTORNEY.

Patented Dec. 16, 1924.

1,519,602

UNITED STATES PATENT OFFICE.

ERLE C. ZIMMERMAN AND IRA WILLIAMS, OF AKRON, OHIO, ASSIGNORS TO THE FIRESTONE TIRE AND RUBBER COMPANY, OF AKRON, OHIO, A CORPORATION OF OHIO.

EXTENSOMETER.

Application filed January 21, 1922. Serial No. 530,829.

*To all whom it may concern:*

Be it known that we, ERLE C. ZIMMERMAN and IRA WILLIAMS, citizens of the United States, residing at Akron, in the county of Summit, State of Ohio, have invented certain new and useful Improvements in Extensometers, of which the following is a specification.

This invention relates to an extensometer, or device for measuring the hardness or compressibility of certain substances which are readily compressible, the instrument being particularly designed for measuring the compressibility of rubber or the like. The purpose of the invention is to improve upon prior devices for use in this work providing a device which will give accurate readings on all sorts of rubber compounds and will be adjustable for a large variety of stocks so as to give a wide range to the instrument. A further object is to design and construct an instrument of this type which will be compact and simple and will not easily get out of order.

These and other objects are attained by the improved instrument shown and described herein, it being understood that changes may be made in the form and arrangement of the parts without departing from the invention or sacrificing any of its benefits.

In the drawings:

Fig. 1 is a front elevation of the improved form of extensometer or hardness tester.

Fig. 2 is a longitudinal section.

Fig. 3 is a front view of the amplifying mechanism with the face or dial removed.

The device comprises a centrally located casing or box 1, which contains the amplifying mechanism to be described and a dial 2 covered by a glass 3. From one side of the casing extends a short tube 4 in the lower end of which is screw-threaded a foot or bearing piece 5, a lock-nut 6 serving to hold the foot in place. Guided in a centrally located bore in the foot is a rod 7, which extends through the sides of the casing. The lower end of the rod carries a pin 8 which extends below the foot piece 5.

The central portion of the rod 7 within the casing is formed with a rack 9 which is engaged by a small pinion 10, located on a shaft 11 supported in a bearing plate 12 in the rear of the casing and in the dial. The projecting end of the shaft 11 carries a small hand or pointer 13 which travels over a graduated ring 14 inscribed on the face of the dial. The shaft 11 also carries a larger gear 15, which meshes with a small pinion 16 on a shaft 17 mounted in the plate 12 and the dial. The end of the shaft 17 carries a larger hand or pointer 18 which travels over a series of graduations 19 around the circumference of the dial.

The relative speed of rotation of the hands 13 and 18 bears a definite relation to the graduation on the dials 14 and 19 so that a graduation on the former represents a revolution or a half revolution of the hand 18. In this way the total movement of the rod 7 and thereby the penetration of the pin 8 may be readily ascertained. An idler gear 20 meshes with the pinion 16 being supported on a shaft 21 similarly mounted on the plate 12 and dial 2, and around a barrel 22 on the shaft 21 is arranged a light coil spring 23 which serves to take up any looseness within the gearing which has been described. The plate 12 is weighted at its outer end as shown in Fig. 3 to keep the pinion 10 in mesh with the rack 9. A light coil spring 24 may be placed around the rod 7 being held between the upper side of the casing and a pin on the rod.

The rod 7 extends above the top of the casing and within the lower end of an elongated tube 25 which fits over a projection 26, on the outer side of the casing. The upper end of the rod 7 is provided with a collar 27 which serves as a seat for a long coil spring 28 the upper end of which is confined by a headed pin 29 near the top of the tube 25.

The pin or stop 29 is held down by a screw 30 which is threaded in the top of the tube 25, the screw being secured in a plug 31 in the outer end of a casing or sleeve 32 which surrounds the upper end of the tube 25. A series of threaded holes 33 are formed in the side of the tube 25 and a screw threaded pin 34 is received in the lower end of the sleeve 32. When it is desired to adjust the tension of the spring 28 to enable the instrument to be used on stocks having wide variations in compressibility, the pin 34 is unscrewed from the hole 33 which it occupies and the sleeve adjusted up or down until the pin is in register with another hole whereupon it is reinserted and locks the screw in adjusted position. In this way the capacity of the instrument is increased, compensation being made in calculating the compressibility of the stock according to the position of the sleeve 32.

In using the instrument, the foot 5 is placed on the surface of the stock to be tested as shown in Fig. 1. The amount of depression of the stock caused by the spring 28 is measured by the position of the hands 13 and 18.

It will be seen that, by the use of the device shown herein a quick and accurate reading may be obtained which will give a definite measurement of the compressibility of the stock which is tested. The instrument can be handled without danger of injuring it and a wide range of adjustments is afforded.

Claims:—

1. In a device of the character described, a foot piece, a rod slidably mounted in the foot piece, a pin carried by said rod projecting beyond the plane of the foot piece, an amplifying and indicating mechanism operated by the pin and means to exert a yielding pressure upon the pin.

2. In a device of the character described, a base, a pin slidably mounted in the base and adapted to project beyond the plane thereof, amplifying and indicating mechanism connected with the pin and operable thereby, a spring device to force the pin outwardly of the base and means to adjust the pressure of the spring.

3. In a device of the character set forth, a base, a rod slidably mounted in the base, a rack on said rod, a pin on the end of said rod adapted to project beyond the plane of the base, a train of gearing engaged with the rack, indicating mechanism operated by said gearing and yielding means acting to press the pin outwardly beyond the plane of the base.

4. In a device of the character set forth, a base, a rod slidably mounted in the base, a pin on the end of the rod adapted to project beyond the plane of the base, a rack on the rod, a train of gearing engaging said rack, indicating devices operated by said gearing, a spring to press the pin outwardly of the base, and adjusting mechanism to vary the pressure of the spring.

5. In a device of the character set forth, a casing, motion amplifying and indicating mechanism within the casing, a rod extending through the casing and connected to said mechanism, a foot piece, a pin on one end of said rod projecting beyond the plane of the foot piece, a spring bearing upon the other end of the rod, and adjusting mechanism to regulate the pressure of said spring.

6. In a device of the character set forth, a casing, gearing constituting an amplifying and indicating mechanism within said casing, a rod extending through said casing, and connected with said gearing, a pin on one end of said rod, a base beyond the plane of which the pin projects, a spring bearing on the other end of said rod, a tubular housing for said spring attached to the casing, a screw threaded within the upper end of the casing and bearing upon the upper end of the spring and means to hold the screw in varying positions of adjustment.

7. A device of the character described comprising a casing having an abutment to engage the material to be tested, a spindle mounted to move inwardly with reference to said casing when pressed by the material, said spindle having an end to engage the material, a spring tending to resist the inward movement of the spindle, the size of said end and the resistance of said spring having a predetermined relation when the material engages said abutment, means to adjust the compression of said spring, and means operatively connected with said spindle to indicate the hardness of the material.

ERLE C. ZIMMERMAN.
IRA WILLIAMS.